US012761794B2

(12) United States Patent
Zhou et al.

(10) Patent No.: US 12,761,794 B2
(45) Date of Patent: *Oct. 13, 2026

(54) ADAPTIVE MEDIA MANAGEMENT FOR MEMORY SYSTEMS

(71) Applicant: Micron Technology, Inc., Boise, ID (US)

(72) Inventors: Zhenming Zhou, San Jose, CA (US); Ying Yu Tai, Mountain View, CA (US)

(73) Assignee: Micron Technology, Inc., Boise, ID (US)

( * ) Notice: Subject to any disclaimer, the term of this patent is extended or adjusted under 35 U.S.C. 154(b) by 44 days.

This patent is subject to a terminal disclaimer.

(21) Appl. No.: 18/933,218

(22) Filed: Oct. 31, 2024

(65) Prior Publication Data

US 2025/0060876 A1 Feb. 20, 2025

Related U.S. Application Data

(63) Continuation of application No. 17/739,755, filed on May 9, 2022, now Pat. No. 12,164,769.

(51) Int. Cl.
*G06F 3/06* (2006.01)
*G06F 11/30* (2006.01)

(52) U.S. Cl.
CPC ............ *G06F 3/061* (2013.01); *G06F 3/0614* (2013.01); *G06F 3/0655* (2013.01); *G06F 3/0683* (2013.01); *G06F 11/3037* (2013.01)

(58) Field of Classification Search
None
See application file for complete search history.

(56) References Cited

U.S. PATENT DOCUMENTS

| | | | | |
|---|---|---|---|---|
| 8,248,856 | B2 * | 8/2012 | Goss | G11C 16/26 365/210.11 |
| 9,330,790 | B2 * | 5/2016 | Kim | G11C 16/349 |
| 9,489,146 | B2 | 11/2016 | Erez | |
| 10,528,099 | B2 * | 1/2020 | Fackenthal | G06F 3/061 |
| 10,838,645 | B2 * | 11/2020 | Basu | G06F 3/061 |
| 11,301,371 | B2 * | 4/2022 | Jang | G06F 12/0246 |
| 11,404,127 | B1 | 8/2022 | Kumar et al. | |
| 11,797,190 | B2 * | 10/2023 | Muthiah | G06F 3/0659 |
| 11,797,219 | B2 | 10/2023 | Shim et al. | |
| 11,922,027 | B2 * | 3/2024 | Huang | G06F 3/0679 |
| 2012/0311232 | A1 | 12/2012 | Porterfield | |
| 2015/0301754 | A1 | 10/2015 | Kochar et al. | |
| 2016/0117216 | A1 | 4/2016 | Muchherla et al. | |
| 2020/0333976 | A1 | 10/2020 | Cariello | |
| 2023/0359356 | A1 | 11/2023 | Zhou et al. | |

* cited by examiner

*Primary Examiner* — Elias Mamo
(74) *Attorney, Agent, or Firm* — Schwegman Lundberg & Woessner, P.A.

(57) ABSTRACT

Aspects of the present disclosure configure a system component, such as a memory sub-system controller, to provide adaptive media management based on memory component reliabilities. The controller can access configuration data to determine a reliability grade associated with individual groups of the memory components. The controller can then adaptively select between different media management operations based on the reliability grade associated with each individual group of the memory components.

20 Claims, 5 Drawing Sheets

ADAPTIVE MEDIA MANAGEMENT FOR MEMORY SYSTEMS

PRIORITY APPLICATION

This application is a continuation of U.S. application Ser. No. 17/739,755, filed May 9, 2022, which is incorporated herein by reference in its entirety.

TECHNICAL FIELD

Embodiments of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
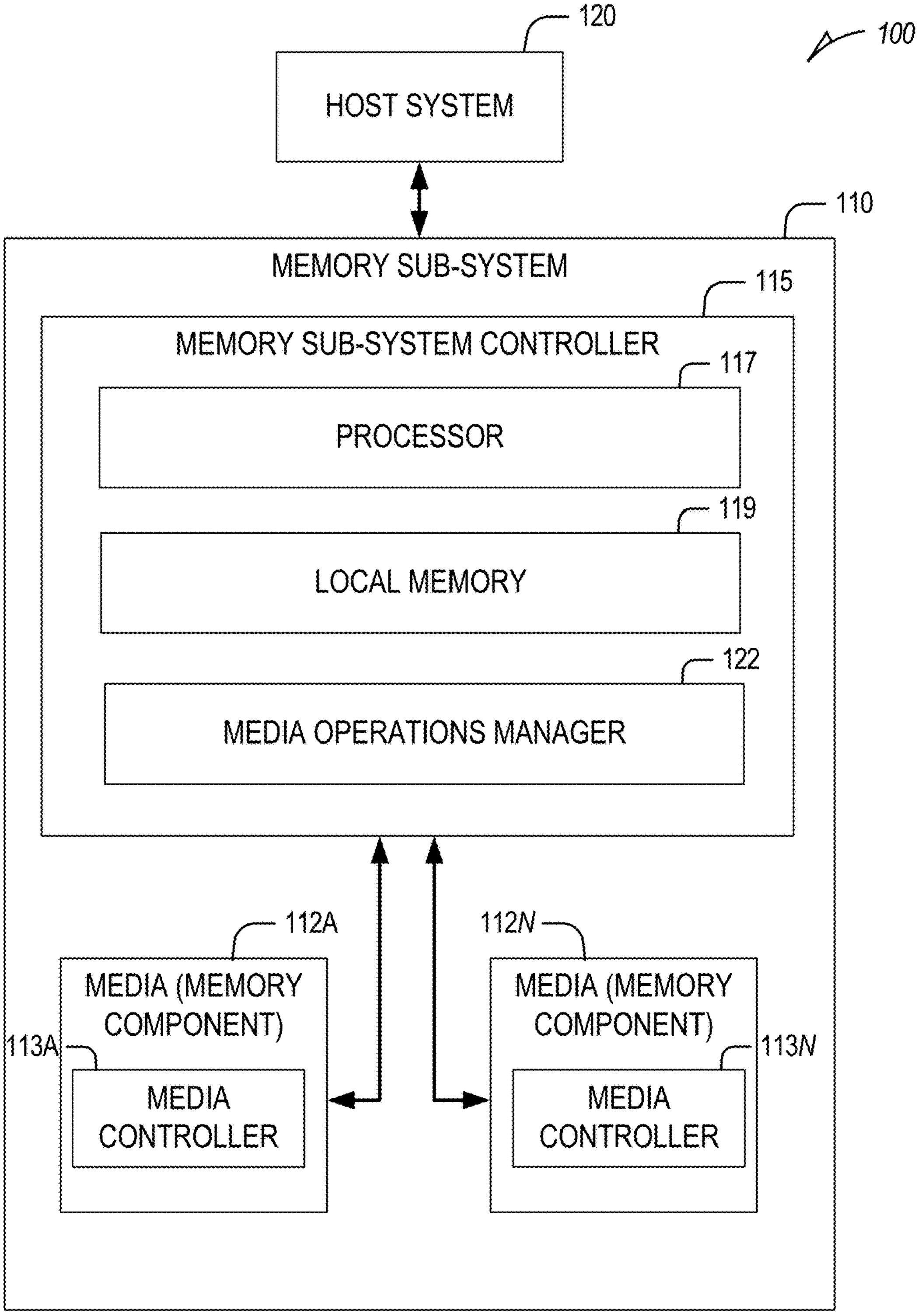
FIG. 1 is a block diagram illustrating an example computing environment including a memory sub-system, in accordance with some embodiments of the present disclosure.

Aspects of the present disclosure configure a system component, such as a memory sub-system controller, to perform different memory management operations on different groups of memory components (e.g., memory dies) based on their respective reliability grades (or measures). The memory sub-system controller can access configuration data associated with a set of memory components. The configuration data can include a table that associates individual groups of memory components with respective reliability grades that describe a data retention parameter, a read disturb parameter, a cross temperature parameter, and/or an endurance parameter of the individual group of memory components. Based on configuration data (which can be stored on the memory components and/or a memory of the controller), the controller can dynamically select an individual media management operation from a plurality of media management operations to perform on the individual group of memory components. This enables the controller to dynamically select and tailor different media management operations to the reliability grade of the corresponding group of memory components, which improves the overall efficiency of operating the memory sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data".

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scan reads all data and identifies the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

There are challenges in efficiently managing or performing media management operations on typical memory devices. Specifically, certain memory devices, such as NAND flash devices, include large die-by-die reliability (RWB) variation. As the technology for such memory devices continues to be scaled down, this die-by-die reliability variation becomes more pronounced and problematic in performing memory management. Current memory systems (e.g., SSD drive or die package systems) associate all of the memory devices in the memory system with a certain reliability specification. The memory systems need to meet the reliability specification to be approved for use and cannot include any particular memory device that fails to meet the reliability specification.

Typical memory systems include many memory components or memory dies on the order of 8, 16, 32, 64, and so forth memory dies. Some of the memory dies can be associated with reliability grades that far exceed the reliability specification while other memory dies have reliability grades that are close to the reliability specification. Current memory controllers perform memory management operations on such memory systems on the basis of the reliability specification rather than the actual reliability grades of the individual memory dies. As a result, an unnecessary amount of memory management operations can end up being performed on memory dies that have a very high reliability grade, which can adversely impact the overall performance of the memory system. For example, typical memory controllers can perform the same scan rate across all of the memory dies based on the worst-case reliability grade of the memory system. While such a scan rate is suitable for memory dies with relatively low reliability grades, this scan rate may not be necessary for memory dies with higher reliability grades and can result in performance of memory scans that are not needed. This waste in memory scans reduces the efficiency, speed and performance of the memory systems. Current memory systems fail to provide a solution that addresses the needs of all memory devices and applications based on their respective reliability grades or measures.

Aspects of the present disclosure address the above and other deficiencies by providing a memory controller that can receive configuration data that associates different memory components with their respective reliability grades and can use that configuration data to selectively perform memory management operations on the respective memory components. For example, the memory controller can perform a first set of memory management operations (e.g., a first scan rate or scan frequency) for a first set of memory components associated with a first reliability grade while performing a second set of memory management operations (e.g., a second scan rate or scan frequency) for a second set of memory components associated with a second reliability grade. As a result, the memory controller can tailor the memory management operations to their particular reliability grades of the memory components without having to sacrifice performance by applying the same memory management operations across all of the memory components. This increases the efficiency of operating memory systems.

For some embodiments, the memory sub-system (e.g., memory sub-system controller) can access configuration data associated with the set of memory components. The memory sub-system can determine, based on the configuration data, one or more reliability grades associated with different groups of memory components of the set of memory components. The memory sub-system can select, for an individual group of memory components of the set of memory components, an individual media management operation from a plurality of media management operations based on an individual reliability grade associated with the individual group of memory components. Thereafter, the memory sub-system performs the individual media management operation on the individual group of memory components.

In some examples, the reliability grades of each memory component are determined when the memory components are manufactured and packaged. The reliability grades are then stored in configuration data associated with the packaged memory components. In some examples, the reliability grades are determined, updated and/or predicted by the memory sub-system after the memory components are installed and in use. Namely, the memory sub-system can perform various test operations on the memory components over the course of several time periods (e.g., seconds, hours, days, and so forth). The memory sub-system can obtain test results and compute or predict the reliability grade of each memory component. The memory sub-system can then group or bin the memory components according to their respective reliability grades. The memory sub-system can generate locally configuration data including a table that associates different bins or groups of memory components with their respectively determined reliability grades. The reliability grades can describe at least one of a data retention parameter, a read disturb parameter, a cross temperature parameter, or an endurance parameter.

In some examples, the configuration data can be received by the controller from the firmware controller, a host system, or the memory components. In some examples, the memory sub-system can store a table that associates a first reliability grade with a first media management operation and a second reliability grade with a second media management operation. This data can also be stored as part of the configuration data of the memory system. The memory sub-system can determine, based on the configuration data, that an individual group of memory components is associated with the first reliability grade. In such cases, the memory sub-system searches the table to select the first media management operation associated with the first reliability grade. For example, the memory sub-system can select a first scan rate to perform on the individual group of memory components.

In some examples, the individual media management operation is the first media management operation and the individual group of memory components is a first group of memory components. The memory sub-system can determine, based on the configuration data, that a second group of memory components is associated with the second reliability grade. The memory sub-system searches the table to select the second media management operation associated with the second reliability grade. For example, the memory sub-system can select a second scan rate that is faster or slower than the first scan rate. The memory sub-system can then perform the second media management operation on the second group of memory components. In some examples, the first media management operation is performed on the first group of memory components while the second media management operation is performed on the second group of memory components. In such cases, a first media scan frequency can be performed on the first group of memory components and a second media scan frequency on be performed on the second group of memory components.

In this way, different memory management operations can be performed on different groups, bins, or sets of memory components based on their respective reliability grades. The reliability grades can describe or represent different read and write temperature ranges. In such cases, the memory sub-system can apply different media scan frequencies to different dies, based on the die's reliability grade. As such, the dies with relatively poor or low reliability or capability grades can be scanned more frequently to avoid read failure, while the dies with relatively better or higher reliability or capability grades can be scanned less frequently to maintain the same system performance.

Though various embodiments are described herein as being implemented with respect to a memory sub-system (e.g., a controller of the memory sub-system), some or all of the portions of an embodiment can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies).

In some examples, the first memory component 112A or group of memory components including the first memory component 112A can be associated with a first reliability (capability) grade, value or measure. The terms "reliability grade," "value" and "measure" are used interchangeably throughout and can have the same meaning. The second memory component 112N or group of memory components including the second memory component 112N can be associated with a second reliability (capability) grade, value or measure. In some examples, each memory component 112A to 112N can store respective configuration data that specifies the respective reliability grade. In some examples, a memory or register can be associated with all of the memory components 112A to 112N which can store a table that maps different groups, bins or sets of the memory components 112A to 112N to respective reliability grades.

In some embodiments, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative-and (NAND)-type flash memory. Each of the memory components 112A to 112N can include one or more arrays of memory cells such as single-level cells (SLCs) or multi-level cells (MLCs) (e.g., TLCs or QLCs). In some embodiments, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some embodiments, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones. In some examples, different memory cells within each memory component 112A to 112N can be associated with different reliability grades. In such cases, different memory management operations can be performed on different groups of memory cells within each memory component 112A to 112N.

The memory sub-system controller 115 can communicate with the memory components 112A to 112N to perform operations such as reading data, writing data, or erasing data at the memory components 112A to 112N and other such operations. The memory sub-system controller 115 can communicate with the memory components 112A to 112N to perform various memory management operations, such as different scan rates, different scan frequencies, different wear leveling, different read disturb management, different near miss ECC operations, and/or different dynamic data refresh.

The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another embodiment of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112N to 112N. The configuration data can describe the reliability grades associated with different groups of the memory components 112N to 112N.

The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some embodiments, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to selectively and adaptively perform different memory management operations on the memory components 112A to 112N on the basis of the reliability grade associated with the respective memory components 112A to 112N. For example, the media operations manager 122 can access configuration data associated with the set of memory components 112A to 112N. The media operations manager 122 can determine, based on the configuration data, one or more reliability grades associated with different groups of memory components of the set of memory components 112A to 112N. The media operations manager 122 can select, for an individual group of memory components of the set of memory components 112A to 112N, an individual media management operation from a plurality of media management operations based on an individual reliability grade associated with the individual group of memory components 112A to 112N. Thereafter, the media operations manager 122 performs the individual media management operation on the individual group of memory components 112A to 112N.

As an example, the media operations manager 122 can determine that the first memory component 112A is associated with a first reliability grade based on the configuration data. The media operations manager 122 can determine that the second memory component 112N is associated with a second reliability grade based on the configuration data. In such cases, the media operations manager 122 can perform or apply a first scan rate or frequency to the data stored in the first memory component 112A. The media operations manager 122 can perform or apply a second scan rate or frequency to the data stored in the second memory component 112N. In some examples, the media operations manager 122 stores a table that maps different reliability grades or ranges of reliability grades to specific types of memory management operations. In response to determining that the first reliability grade associated with the first memory components 112A falls within a first range of the reliability grades stored in the table, the media operations manager 122 accesses or retrieves a first type of memory management operations that is stored in the table in association with the first range of the reliability grades. The media operations manager 122 can then perform the first type of memory management operation on the first memory components 112A. Similarly, in response to determining that the second reliability grade associated with the second memory components 112N falls within a second range of the reliability grades stored in the table, the media operations manager 122 accesses or retrieves a second type of memory management operations that is stored in the table in association with the second range of the reliability grades. The media operations manager 122 can then perform the second type of memory management operation on the second memory component 112N. In this way, the media operations manager 122 can tailor the type of memory management operation that is performed on different groups of memory components 112A to 112N on the basis of their respectively associated reliability grades.

Depending on the embodiment, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
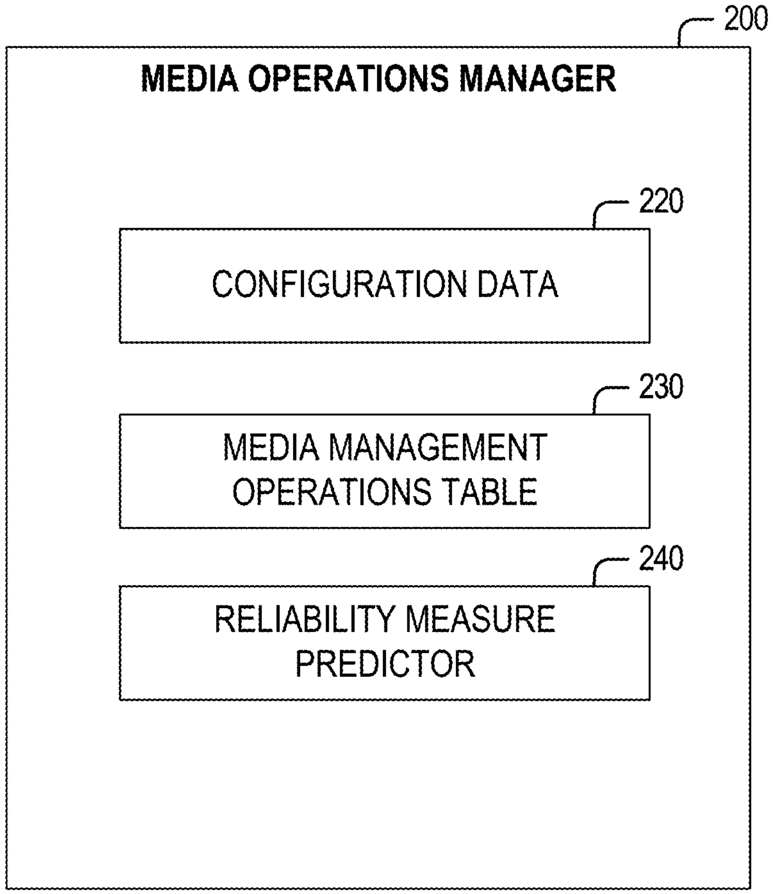
FIG. 2 is a block diagram of an example media operations manager, in accordance with some implementations of the present disclosure.

FIG. 2 is a block diagram of an example media operations manager 200, in accordance with some implementations of the present disclosure. As illustrated, the media operations manager 122 includes configuration data 220, a media management operations table 230, and a reliability measure predictor 240. For some embodiments, the media operations manager 122 can differ in components or arrangement (e.g., less or more components) from what is illustrated in FIG. 2.

The configuration data 220 accesses and/or stores configuration data associated with the memory components 112A to 112N. In some examples, the configuration data 220 is programmed into the media operations manager 122. For example, the media operations manager 122 can communicate with the memory components 112A to 112N to obtain the configuration data and store the configuration data 220 locally on the media operations manager 122. In some examples, the media operations manager 122 communicates with the host system 120. The host system 120 receives input from an operator or user that specifies parameters including reliability grades of different bins, groups or sets of the memory components 112A to 112N. The media operations manager 122 receives configuration data from the host system 120 and stores the configuration data in the configuration data 220.

In some examples, the media operations manager 122 performs one or more test operations on different groups of the memory components 112A to 112N. In some examples, the configuration data 220 is updated during runtime based on reliability measure predictions performed by the reliability measure predictor 240 using the test operations. The test operations are configured to determine or predict reliability of each of the memory components 112A to 112N. Based on a result of the test operations, the media operations manager 122 can store or update the reliability grades stored in the configuration data 220 for the different groups of memory components 112A to 112N. In some examples, the media operations manager 122 can periodically or routinely perform the test operations. The media operations manager 122 can determine that an individual memory component 112A is associated with a first reliability grade based on the configuration data 220. The media operations manager 122 can perform a set of test operations on the individual memory component 112A and can determine, based on a result of the test operations, that the reliability grade of the individual memory component 112A has increased or decreased and is now a second reliability grade. The media operations manager 122 can, in response, transition the individual memory components 112A from being associated with a first group of individual memory components 112A to 112N to a second group of individual memory components 112A to 112N that is associated with the second reliability grade.

In some examples, the media management operations table 230 stores a table or map that associates different reliability grades or ranges of reliability grades to specific types of memory management operations. For example, a first range of reliability grades can be associated with a first scan rate and a second range of reliability grades can be associated with a second scan rate or different type of memory management operation. The media operations manager 200 can access the configuration data 220 to determine the reliability grade associated with a first memory component 112A. The media operations manager 200 can compare the reliability grade associated with the first memory components 112A with each of the ranges stored in the table 230. In response to determining that the reliability grade associated with the first memory components 112A falls within a first range of the reliability grades stored in the table 230, the media operations manager 122 accesses or retrieves a first type of memory management operations that is stored in the table 230 in association with the first range of the reliability grades (e.g., a first scan rate or frequency).

The media operations manager 122 can then perform the first type of memory management operation on the first memory component 112A. Similarly, the media operations manager 200 can access the configuration data 220 to determine the reliability grade associated with a second memory component 112N. The media operations manager 200 can compare the reliability grade associated with the second memory component 112N with each of the ranges stored in the table 230. In response to determining that the reliability grade associated with the second memory component 112N falls within a second range of the reliability grades stored in the table 230, the media operations manager 122 access or retrieves a second type of memory management operations that is stored in the table 230 in association with the second range of the reliability grades (e.g., a second scan rate or frequency). The media operations manager 122 can then perform the second type of memory management operation on the second memory component 112N. In this way, the media operations manager 122 can tailor the type of memory management operation that is performed on different groups of memory components 112A to 112N on the basis of their respectively associated reliability grades.

The reliability measure predictor 240 continuously or routinely monitors health and reliability of the memory components 112A to 112N. The reliability measure predictor 240 can apply one or more machine learning models or heuristics on performance criteria associated with the memory components 112A to 112N. Based on an output of the machine learning models or heuristics, the reliability measure predictor 240 can determine or predict updates to the reliability grades currently associated with the memory components 112A to 112N. As an example, if the read errors associated with an individual memory component 112A have increased over a given time period by more than a threshold value, the reliability measure predictor 240 can decrease the reliability grade associated with the individual memory component 112A. In such cases, the reliability measure predictor 240 can search the configuration data 220 for the current reliability grade stored in association with the individual memory component 112A. The reliability measure predictor 240 can replace the current reliability grade with a decreased reliability grade for the individual memory component 112A. Namely, the reliability measure predictor 240 can move the individual memory component 112A to a different group or bin of memory components 112A to 112N that is associated with a lower reliability grade than the group or bin of memory components 112A to 112N that currently includes the individual memory component 112A.

Figure 3:
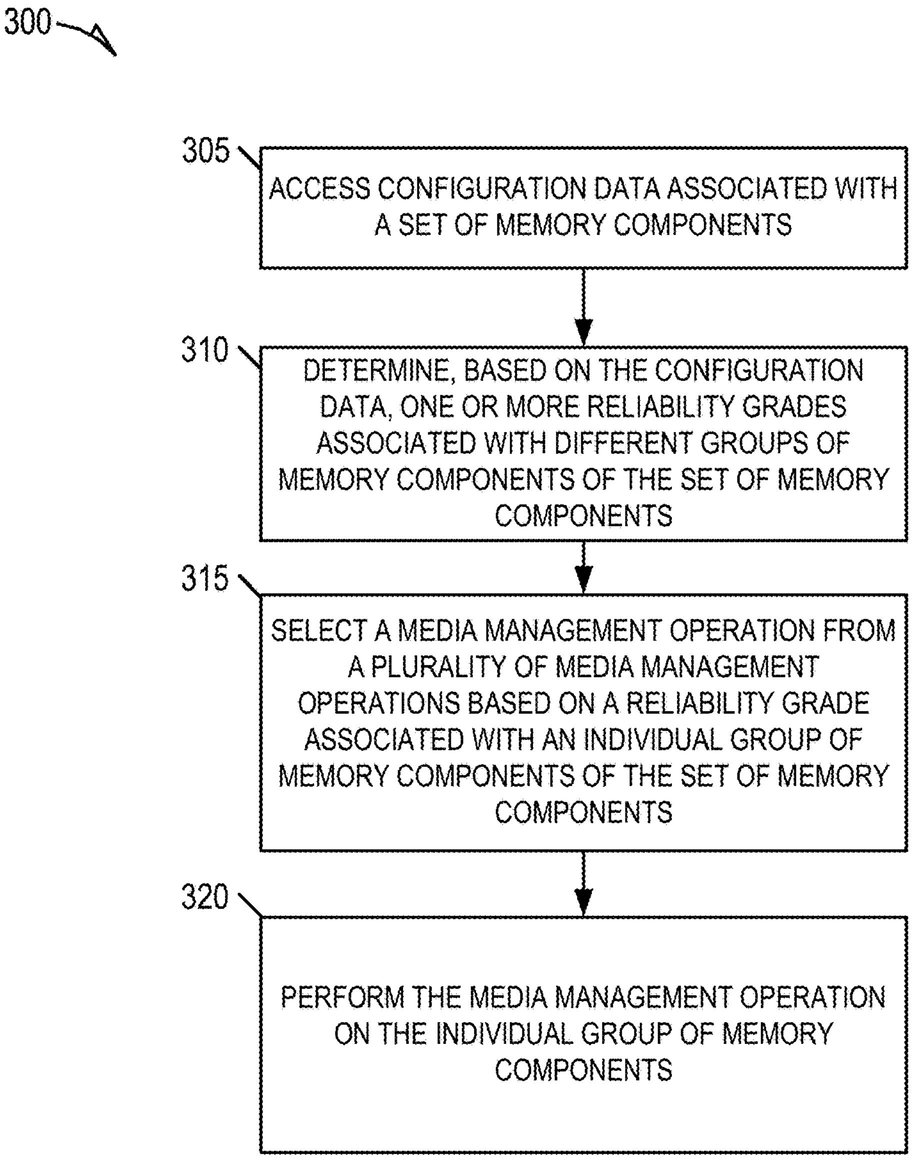
FIG. 3 is a flow diagram of an example method to selectively perform media management operations based on reliability grades, in accordance with some implementations of the present disclosure.

FIG. 3 is a flow diagram of an example method 300 to selectively perform media management operations based on reliability grades, in accordance with some implementations of the present disclosure. The method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method 300 is performed by the media operations manager 122 of FIG. 1. Although the processes are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring now FIG. 3, the method (or process) 300 begins at operation 305, with a media operations manager 122 of a memory sub-system (e.g., memory sub-system 110) accessing configuration data, such as from a local storage register and/or from a processing device, such as the memory sub-system controller 115 (FIG. 1). For some embodiments, the configuration data is received from a host system (e.g., the host system 120) communicatively coupled to the memory sub-system.

At operation 310, the media operations manager 122 of the memory sub-system determines, based on the configuration data, one or more reliability grades associated with different groups of memory components of the set of memory components. Thereafter, at operation 315, the media operations manager 122 selects a media management operation from a plurality of media management operations based on a reliability grade associated with an individual group of memory components of the set of memory components. Then, at operation 320, the media operations manager 122 performs the media management operation on the individual group of memory components.

Figure 4:
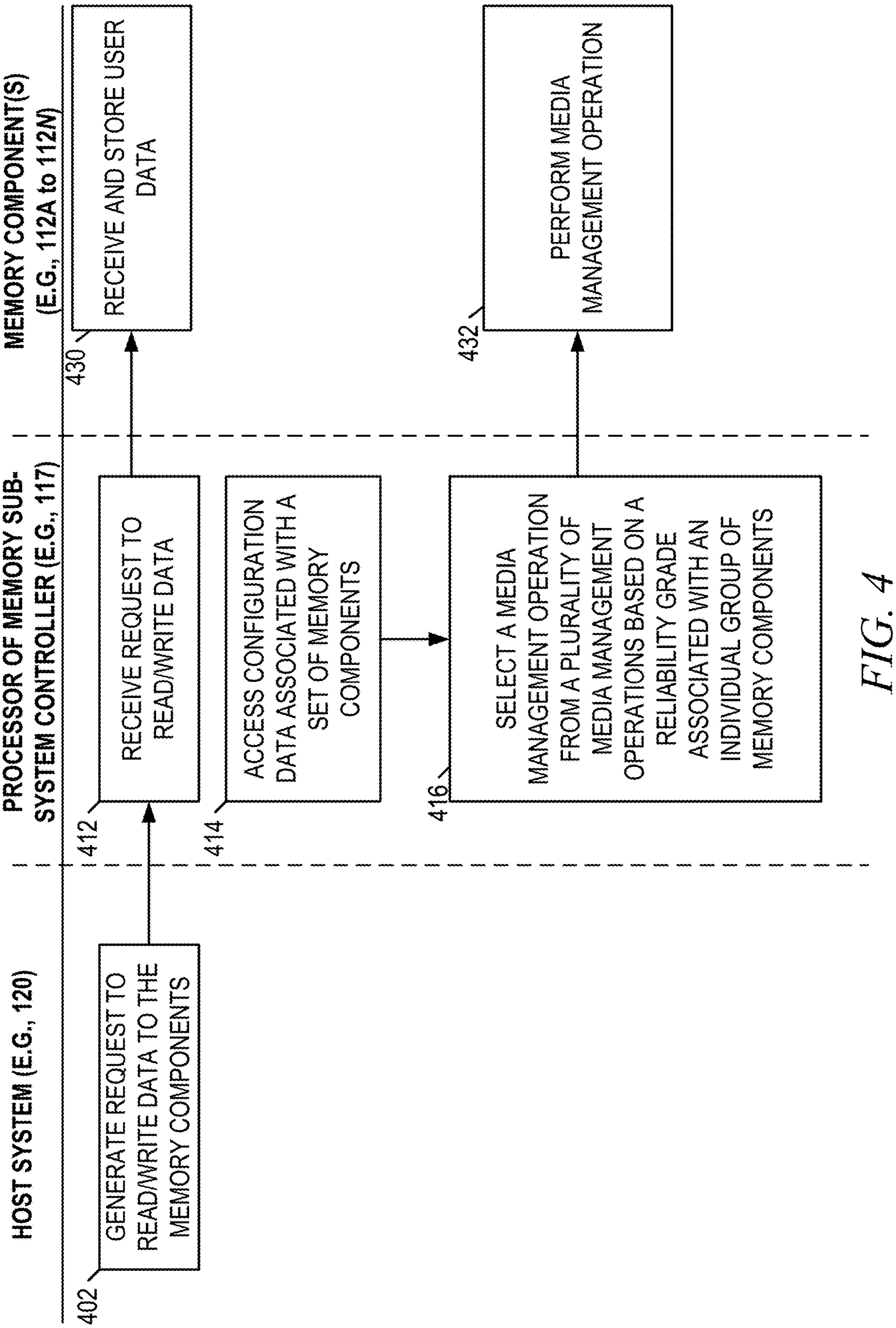
FIG. 4 provides an interaction diagram illustrating interactions between components of the computing environment in the context of some embodiments in which a media operations manager is used.

FIG. 4 provides an interaction diagram illustrating interactions between components of the computing environment 100 in the context of some embodiments. The operations of the method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by the memory sub-system controller 115 and/or by the media operations manager 122. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment.

In the context of the example illustrated in FIG. 4, the host system can comprise the host system 120, the processor of the memory sub-system controller can comprise the processor 117 of the memory sub-system 110, and the one or more memory components can comprise at least one of the memory components 112A to 112N.

As shown in FIG. 4, at operation 402, the host system (e.g., via a processor of the host system 120) generates a request to read/write data to the memory components and, at operation 412, the processor of the memory sub-system controller receives the request. The processor of the memory sub-system controller generates instructions to read/write the data to the memory components 112A to 112N. The memory components 112A to 112N receive the instructions and at operation 430, the memory components 112A to 112N receive and store the user data.

During startup, at runtime, continuously, and/or periodically, at operation 414, the processor of the memory sub-system controller accesses configuration data associated with the set of memory components 112A to 112N. The processor of the memory sub-system controller reads the configuration data to determine the reliability grade associated with different groups of the set of memory components 112A to 112N. The configuration data can also describe the type of memory (media) management operations to perform based on a range or specific reliability grade. Using the configuration data, based on the reliability grade of an individual group of the set of memory components 112A to 112N, at step 416, the processor of the memory sub-system controller selects a media management operation to perform from a plurality of media management operations.

The processor of the memory sub-system controller generates instructions to perform the selected media management operation and provides those instructions to the set of memory components 112A to 112N. The set of memory components 112A to 112N, at operation 432, perform the media management operation corresponding to the instructions received from the processor of the memory sub-system controller. In some examples, a first group of the memory components 112A to 112N (associated with a first reliability grade) can perform a first type of media management operation while a second group of the memory components 112A to 112N (associated with a second reliability grade) can perform a second type of media management operation.

Figure 5:
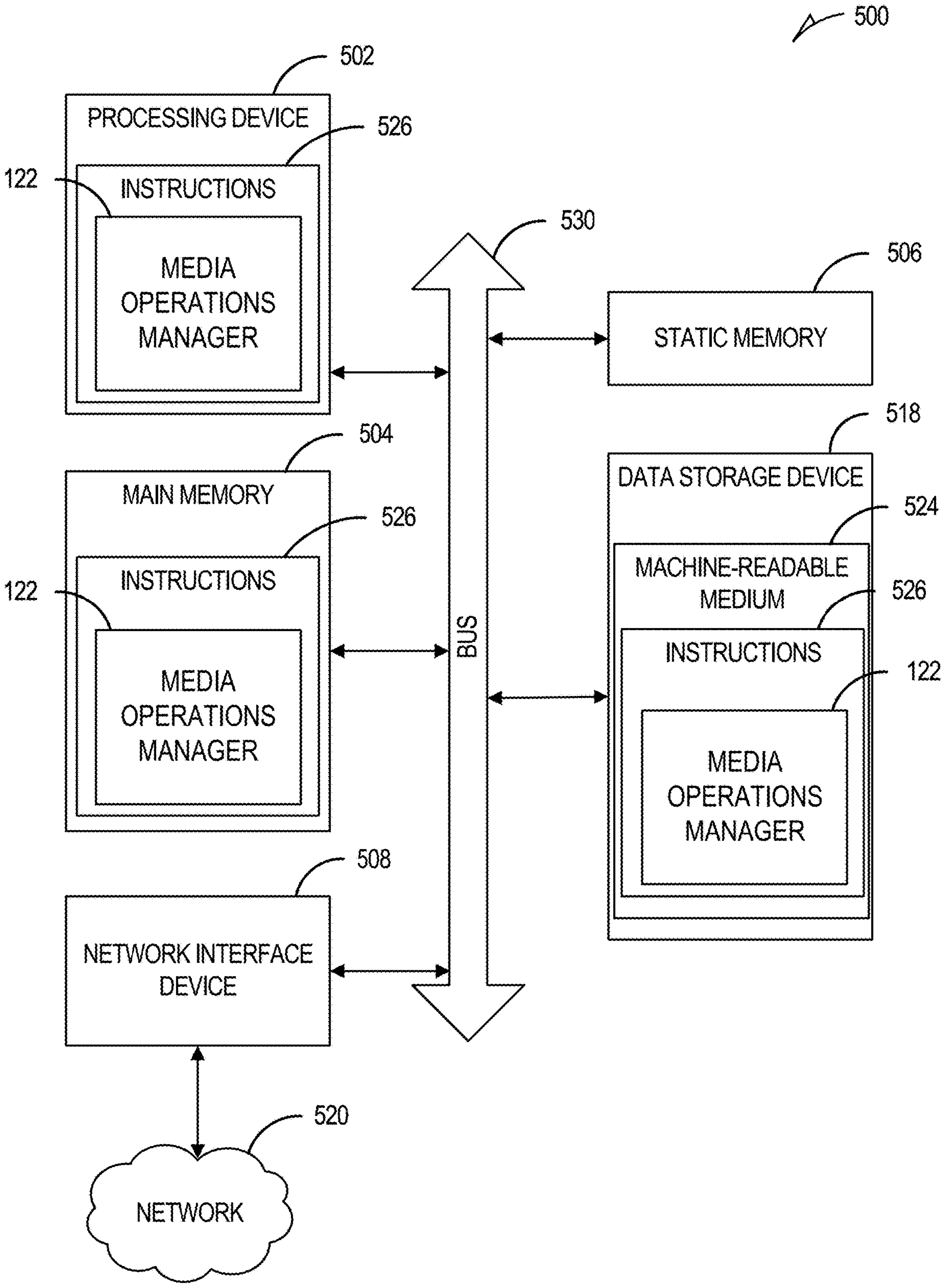
FIG. 5 is a block diagram illustrating a diagrammatic representation of a machine in the form of a computer system within which a set of instructions can be executed for causing the machine to perform any one or more of the methodologies discussed herein, in accordance with some embodiments of the present disclosure.

FIG. 5 illustrates an example machine in the form of a computer system 500 within which a set of instructions can be executed for causing the machine to perform any one or more of the methodologies discussed herein. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 implement functionality corresponding to the media operations manager 122 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a set of memory components of a memory sub-system; and a processing device operatively coupled to the set of memory components, the processing device being configured to perform operations comprising:

accessing configuration data associated with the set of memory components; and performing an individual media management operation on an individual group of memory components of the set of memory components, the individual media management operation selected from a plurality of media management operations based on an individual reliability measure associated with the individual group of memory components.

2. The system of claim 1, the operations comprising:

determining, based on the configuration data, one or more reliability grades associated with different groups of memory components of the set of memory components.

3. The system of claim 1, wherein the configuration data comprises a table that associates the individual group of memory components with a first reliability grade and associates another group of memory components with a second reliability grade.

4. The system of claim 1, wherein the individual reliability measure describes at least one of a data retention parameter, a read disturb parameter, a cross temperature parameter, or an endurance parameter.

5. The system of claim 1, wherein the plurality of media management operations comprises different media scan rates.

6. The system of claim 1, the operations comprising:

storing a table that associates a first reliability grade with a first media management operation and a second reliability grade with a second media management operation.

7. The system of claim 6, the operations comprising:

determining, based on the configuration data, that the individual group of memory components is associated with the first reliability grade; and searching the table to select the first media management operation associated with the first reliability grade.

8. The system of claim 7, wherein the individual media management operation is the first media management operation, wherein the individual group of memory components is a first group of memory components, the operations comprising:

determining, based on the configuration data, that a second group of memory components is associated with the second reliability grade;

searching the table to select the second media management operation associated with the second reliability grade; and performing the second media management operation on the second group of memory components.

9. The system of claim 8, wherein the first media management operation is performed on the first group of memory components while the second media management operation is performed on the second group of memory components.

10. The system of claim 8, the operations comprising:

performing a first media scan frequency on the first group of memory components; and performing a second media scan frequency on the second group of memory components.

11. The system of claim 1, the operations comprising:

predicting reliability measures for individual groups of the set of memory components; and storing the predicted reliability measures as part of the configuration data.

12. The system of claim 1, wherein the individual reliability measure represents different read and write temperature ranges, wherein a first media management operation is associated with a first reliability grade, and wherein a second media management operation is associated with a second reliability grade.

13. A computerized method comprising:

accessing, by a processing device operatively coupled to a set of memory components of a memory sub-system, configuration data associated with the set of memory components; and performing, by the processing device, an individual media management operation on an individual group of memory components of the set of memory components, the individual media management operation selected from a plurality of media management operations based on an individual reliability measure associated with the individual group of memory components.

14. The method of claim 13, wherein the configuration data comprises a table that associates the individual group of memory components with a first reliability grade and associates another group of memory components with a second reliability grade.

15. The method of claim 13, wherein the individual reliability measure describes at least one of a data retention parameter, a read disturb parameter, a cross temperature parameter, or an endurance parameter.

16. The method of claim 13, wherein the plurality of media management operations comprises different media scan rates.

17. The method of claim 13, comprising:

storing a table that associates a first reliability grade with a first media management operation and a second reliability grade with a second media management operation.

18. The method of claim 17, comprising:

determining, based on the configuration data, that the individual group of memory components is associated with the first reliability grade; and searching the table to select the first media management operation associated with the first reliability grade.

19. A non-transitory computer-readable storage medium comprising instructions that, when executed by a processing device, cause the processing device to perform operations comprising:

accessing configuration data associated with a set of memory components; and performing an individual media management operation on an individual group of memory components of the set of memory components, the individual media management operation selected from a plurality of media management operations based on an individual reliability measure associated with the individual group of memory components.

20. The non-transitory computer-readable storage medium of claim 19, wherein the configuration data comprises a table that associates the individual group of memory components with a first reliability grade and associates another group of memory components with a second reliability grade.

* * * * *